United States Patent [19]

Moraillon

[11] Patent Number: 4,553,159
[45] Date of Patent: Nov. 12, 1985

[54] COLOR TELEVISION CAMERA COMPRISING A TRICHROME MATRIX FILTER

[75] Inventor: Jean-Yves Moraillon, Paris, France
[73] Assignee: Thomson-Brandt, Paris, France
[21] Appl. No.: 467,050
[22] Filed: Feb. 16, 1983

[30] Foreign Application Priority Data

Feb. 19, 1982 [FR] France .................. 82 02792

[51] Int. Cl.[4] .............................................. H04N 9/07
[52] U.S. Cl. .................................................. 358/44
[58] Field of Search ......................... 358/44, 41, 43

[56] References Cited

U.S. PATENT DOCUMENTS

| | | |
|---|---|---|
| 4,121,244 | 10/1978 | Nakabe et al. .................. 358/44 |
| 4,293,871 | 10/1981 | Macovski ....................... 358/44 |
| 4,453,177 | 6/1984 | Berger ......................... 358/44 |

OTHER PUBLICATIONS

Patents Abstracts of Japan, vol. 2, No. 113, Sep. 20, 1978, p. 6377E78, and JP-A No. 53 79 432, and p. 6376E78, and JP-A No. 53 79 430 (Hitachi Denshi K.K.), Jul. 13, 1978.
Patents Abstracts of Japan, vol. 5, No. 40, Mar. 17, 1981, p. 712E49 and JP-A No. 55163 970, (Nippon Denki K.K.), Dec. 20, 1980.

Primary Examiner—Michael A. Masinick
Attorney, Agent, or Firm—Pollock, Vande Sande & Priddy

[57] ABSTRACT

Color television camera comprising a photosensitive matrix 10, covered by a trichrome matrix filter as well as two charge coupling registers 12, 13, one of which 12 is adapted to read the spots of uneven rank of each line and the other 13 is adapted to read the spots of even rank of lines. The filter is so designed that each register only stores one single color. The arrangement is such, for example, that the green color elements are aligned on vertical bands.

3 Claims, 4 Drawing Figures

COLOR TELEVISION CAMERA COMPRISING A TRICHROME MATRIX FILTER

FIELD OF THE INVENTION

The present invention relates to a color television camera, comprising a three-color matrix filter.

BACKGROUND OF THE INVENTION

Cameras known as "solid sensor cameras" normally comprise a photosensitive matrix covered by a trichrome matrix filter, the arrangement being such that each element of the matrix is assigned to only one single color.

The signals detected at each spot of the matrix are often collected by charge coupling registers CCD. A CCD register is analog to a shift register, but, furthermore, in each of the compartments it stores the amplitude of the signal.

By reason of the large number of points or spots of a photosensitive matrix, it is not possible to collect all the signals by using a single CCD register. This is the reason why two CCD registers are normally used, the first collecting the signals corresponding to the spots of the uneven rank of a line and the second collecting the spots of the even rank of the same line.

BRIEF DESCRIPTION OF THE INVENTION

The present invention results from the observation that with such CCD registers, visible defects are often produced on the image resulting from such a detection and that these defects have the following origin: signals of the same color, for example, green, being supplied by the two registers, if these registers have different gains, the signals of this color are modulated at the line frequency.

In order to overcome this drawback, the camera according to the present invention comprises a trichrome filter having such an arrangement that each register only stores a single color.

In one embodiment, the filter presents vertical bands of a single color, preferably green, alternated with vertical bands formed of an alternation of elements of two other colors, in this example, red and blue, each line only comprising elements of a single color between two elements of the first color, whereas at the following line it is the elements of another color that are intercalated between the elements of the first color.

Preferably, in this latter embodiment, the filter is not provided with opaque horizontal lines of separation within the vertical bands of the first color. Such opaque lines, that are normally provided between the elements of different colors allow the diaphoty defect to be prevented but the presence of these opaque bands limits the sensitivity of the camera since they reduce the useful or effective surface of the photosensitive matrix.

Advantageously, the camera comprises, furthermore, an achromatic signal synthesizing device that uses three colors, without the necessity of using a delay line.

BRIEF DESCRIPTION OF THE DRAWINGS

Other characteristics and advantages of the invention will become apparent from the following description of several embodiments, with reference to the appended drawings in which.

DETAILED DESCRIPTION

Figure 1:
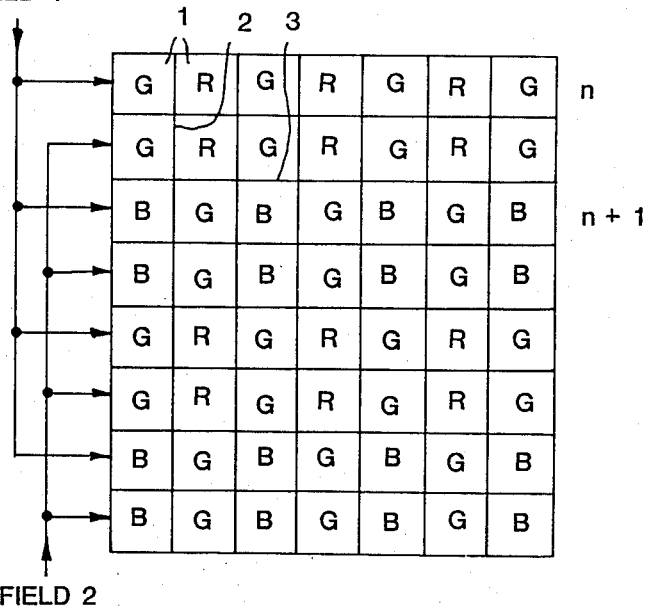
FIG. 1 shows a diagram of a Bayer filter, known per se.

The Bayer filter normally used in television cameras is shown in FIG. 1. It comprises, for each raster, a line of the order n formed of elements 1 alternately green V and red R, whereas the following line of the order n+1, of the same raster is formed of elements 1, alternately blue B and green V, the elements V of line n+1 being vertically aligned with elements R of line n, and, furthermore, elements V of line n being vertically aligned with elements B of line n+1. In order to prevent diaphoty, the elements of different colors are separated by vertical and horizontal opaque bands 2 and 3, respectively.

Filter 11 (FIG. 2) of the camera according to the present invention is distinguished from the filter of FIG. 1 by the fact that all the green elements V are located on vertical columns and not staggered. The line n of raster 1 of the filter shown in FIG. 2 comprises, like the corresponding line of the Bayer filter, alternately green and red elements V and R, and line n+1 comprises alternately green and blue elements V and B, but the elements V of the line n+1 are located on the same vertical column as the elements V of the line n. In other words, this filter 11 presents vertical bands 4, 5, etc, of green V between which are positioned vertical columns 6, 7, etc, formed of alternating red and blue elements R and B.

The sum total of the lengths of the vertical opaque bands is identical to that of the filter shown in FIG. 1. On the other hand, the sum total of the lengths of the horizontal opaque bands of separation is half the corresponding sum total of the Bayer filter.

Figure 2:
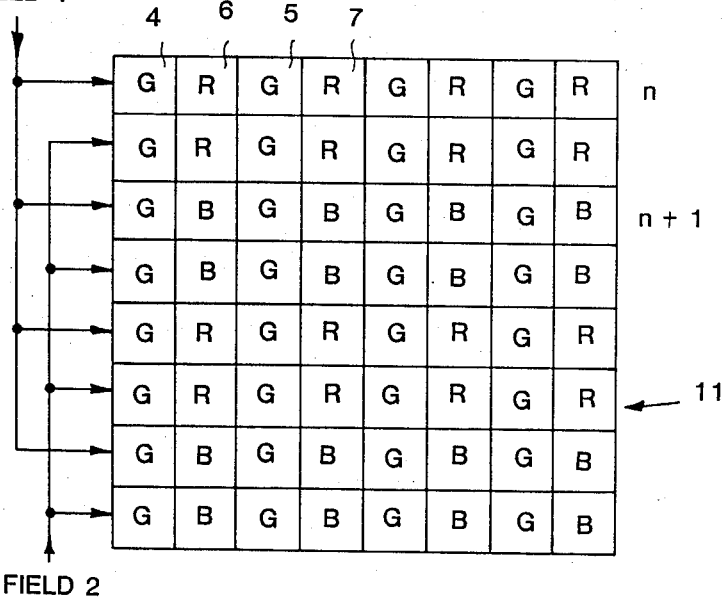
FIG. 2 shows a diagram of a filter used in the camera according to the present invention.
Figure 3:
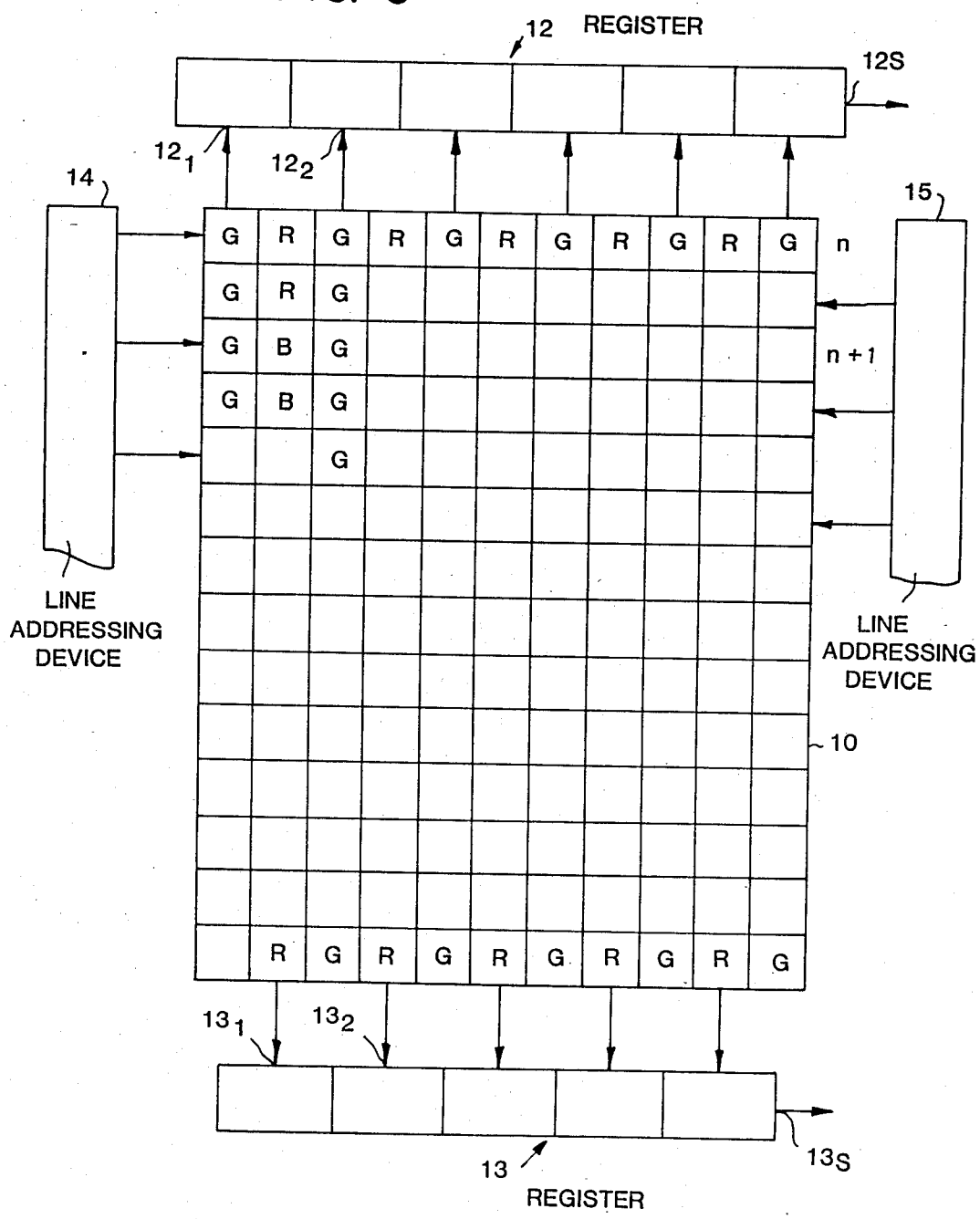
FIG. 3 shows a diagram of a solid analyzer using the filter of FIG. 2.

FIG. 3 represents an analyzer comprising the filter as shown in FIG. 2. This analyzer comprises a photosensitive matrix 10 covered by filter 11 represented on FIG. 2. Of course, there is a trichrome element 11 corresponding to each element of the photosensitive matrix. Each element of the matrix 10 has thus been noted with a color V, R or B.

The signals produced by the various points of the photosensitive matrix are collected by using two registers, to wit: an upper register 12 and a lower register 13. Each of these registers is a charge coupling type shift register CCD.

The upper register is adapted to receive the signals of the elements of the uneven rank of the various lines, whereas register 13 has the same function, but for the elements of the even rank of lines. Each of these registers is charged parallel-wise on its inputs $12_1, 12_2$, etc.. $13_1, 13_2$, etc, but is discharged series-wise on its outputs $12_s$ or $13_s$.

When a line addressing device 14 or 15, having parallel inputs- each of which corresponds to one line- supplies an actuating signal for reading line n, the signals corresponding to green colored elements, of the uneven rank of this line are charged in the register 12, whereas the signals corresponding to the elements of the even rank, red colored for example, are charged in register 13.

Therefore, register 12 is only charged with the signals corresponding to the green color, whereas register 13 only contains signals corresponding to the red color. For the following line, now n+1, register 12 again transmits green colored signals, whereas register 13 will transmit blue colored signals. Therefore, for any given line, each register only transmits a single color.

Figure 4:
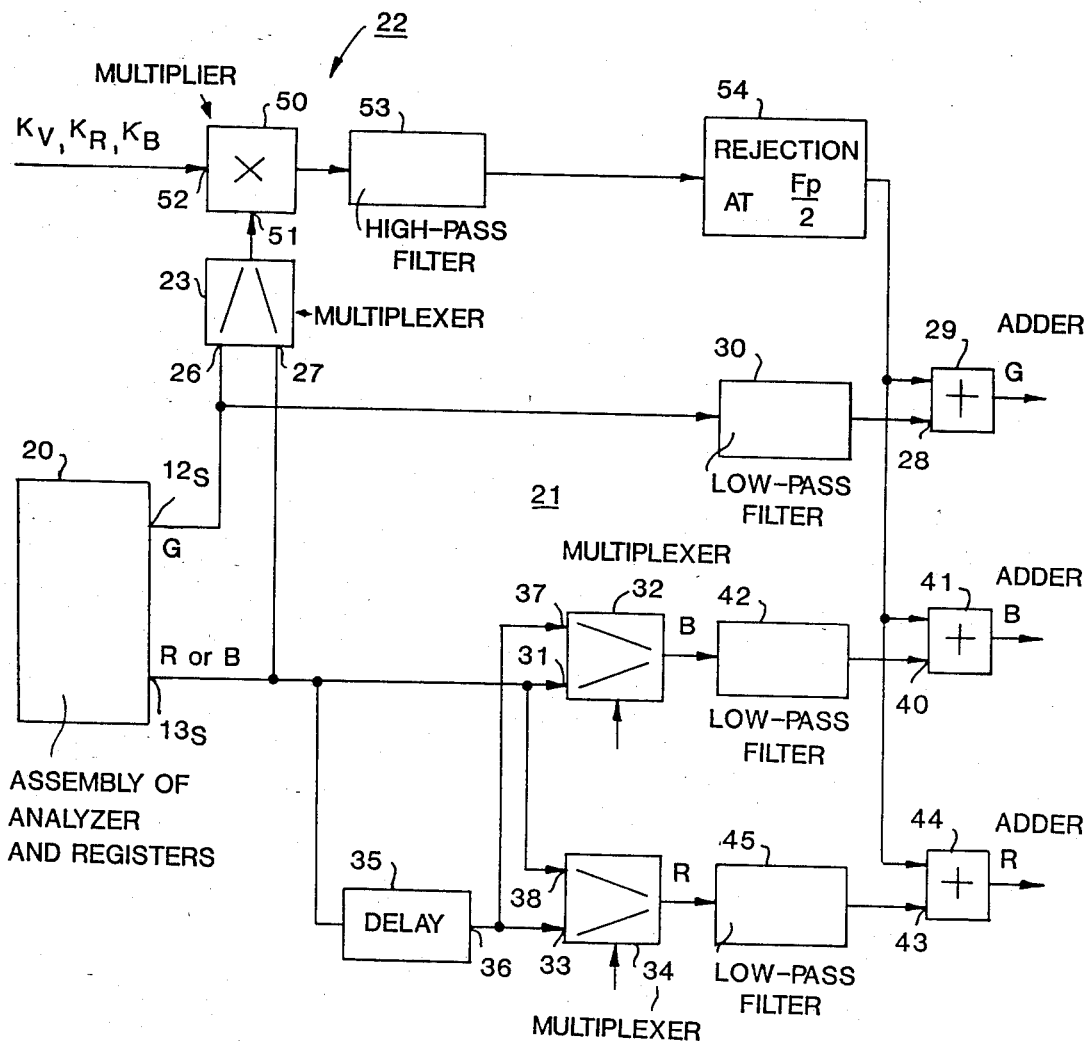
FIG. 4 shows a block diagram of a device for processing the signal supplied by a photosensitive matrix analyzer and the associated trichrome filter.

The signal collected by the analyzer represented in FIG. 3 is preferably processed by the device shown in FIG. 4.

FIG. 4 represents the assembly of the analyzer and registers 12 and 13 as a simple block 20 with two outputs $12_s$ and $13_s$.

In this device, the achromatic signal reconstituting the details of the image is formed by using three colors and not a single green color, as used in the known device associated to a Bayer filter.

The device of FIG. 4 comprises a formation track 22 for forming the color signal and a synthesis track 22 for synthesizing the achromatic signal.

Channel 21 comprises a low-pass filter 30 of high cut-off frequency of about 500 KHz, the input of which is connected to output $12_s$ of assembly 20 and the output of which is connected to the first input 28 of an adder 29.

Output $13_s$ of assembly 20 is connected, on the one hand, directly to a first input 31 of a multiplexer 32, and, on the other hand, to the first input 33 of another multiplexer 34 through the intermediary of a delay line 35. Delay line 35 delays the signal applied to its input by a duration equal to the time needed for scanning one line.

Output 36 of the delay line 35 is also connected to a second input 37 of multiplexer 32. Furthermore, output 13 of assembly 20 is connected directly to the second input 38 of multiplexer 34.

The output of multiplexer 32 is connected to the first input 40 of a second adder 41 through the intermediary of a low-pass filter 32 analog to filter 30. Furthermore, the output of multiplexer 34 is connected to the first input 43 of a third adder 44 through the intermediary of a low-pass filter 45 analog to filters 30 and 42.

The second inputs of adders 29, 41 and 44 receive the output signal of channel 22.

The channel comprises a multiplier 50, one input 51 of which is directly connected to the output of a multiplexer 23, the two inputs 26 and 27 of which are connected to the respective outputs $12_s$ and $13_s$ of assembly 20. The other input 52 of multiplexer 50 is connected to another multiplexer (not shown) supplying, in synchronism with the reading of the analyzer, constant coefficients $K_V$, $K_R$ and $K_B$ for the green, red and blue signals, respectively. In other words, when a green element is being read, it is the coefficient $K_V$ that is applied to input 52 of multiplier 50.

The output of the said multiplier 50 is connected to the second inputs of adders 29, 41 and 44 through the intermediary of, on the one hand, a high-pass filter 53 having a low cut-off frequency of about 500 kHz, and, on the other hand, of a filter 54 rejecting the frequency $F_p/2$, i.e. the point half-frequency that corresponds to the sampling frequency of each color. In the absence of such a filter, parasitic vertical lines will appear on the reproduced image in areas colored with contrasting colors.

Multiplexers 32 and 34 are controlled in such a way that when a blue signal appears on output $13_s$ of assembly 20, this signal is transmitted to the output of multiplier 32, whereas when a red signal appears on output $13_s$, the signal is transmitted to the output of the multiplexer 34.

Therefore, in track 21 the output signals of filters 30, 42 and 45 are low frequency signals representing respectively, green, blue and red; these three colors form the color constituent of the image signal.

Coefficients $K_V$, $K_R$ and $K_B$ are selected in such a way that for an achromaticsignal (white or gray) of constant luminance, the respective amplitudes of the signals supplied by the dots of different colors V, R and B are equal.

The signal supplied by this track 22 is a high frequency achromous signal representing the details of the image. It is superimposed on the color signal due to adders 29, 41 and 44.

In a variant of the invention (not shown), output 25 of multiplexer 23 is connected to two outputs connected to track 21, i.e. on the one hand, to the input of filter 30 and, on the other hand, to the input 31 of multiplexer 32 and to the input of delay line 35.

The color television camera according to the present invention comprising the filter shown in FIG. 2 and the device shown in FIG. 4 is preferably of the digital signal processing type.

In a modification, the filter comprises elements of three other complementary colors, for example, white, green and yellow, instead of using the three primary colors, red, blue and green.

The invention is not limited to the embodiments shown in the appended Figures and described hereinabove. Many modifications and variants may be envisaged by those skilled in the art, without departing from the spirit and scope of the invention as defined in the appended claims.

I claim:

1. A color television camera comprising: a trichrome matrix filter covering a photosensitive matrix; the matrix filter having vertical bands and horizontal lines defining adjacently positioned color elements; elements of a first color located in all alternating bands; second and third color elements intermixed in second remaining alternating bands in a repeated pattern; and a first charge coupled register for reading the first alternating bands on a line by line basis; and a second charge coupled register for reading the second alternating bands on a line by line basis; wherein all stages of first register include at any instant of time data corresponding to elements of the first color; and further wherein all stages of the second register include at sequential instants of time, data corresponding to elements of the second and third colors, respectively.

2. A camera according to claim 1 together with a device for generating non-color signals, the device comprising: a multiplier adapted to multiply each signal, corresponding to color element, by a constant coefficient for each color, resulting in three coefficients supplying at the output to the multiplier, signals of equal amplitudes for a non-colored image of constant light intensity.

3. A camera according to claim 2 further comprising a rejection filter located downstream of the multiplier for eliminating frequency corresponding to the sampling frequency of each color.

* * * * *